(12) United States Patent  (10) Patent No.: US 7,657,021 B2
Flockhart et al.  (45) Date of Patent: Feb. 2, 2010

(54) METHOD AND APPARATUS FOR GLOBAL CALL QUEUE IN A GLOBAL CALL CENTER

(75) Inventors: Andrew D. Flockhart, Thornton, CO (US); Christopher Robinson Howell, Greensboro, NC (US); Eugene P. Mathews, Barrington, IL (US); Chadwick Joseph Romero, Lewisville, TX (US)

(73) Assignee: Avaya Inc., Basking Ridge, NJ (US)

( * ) Notice: Subject to any disclaimer, the term of this patent is extended or adjusted under 35 U.S.C. 154(b) by 1056 days.

(21) Appl. No.: 11/057,925

(22) Filed: Feb. 14, 2005

(65) Prior Publication Data

US 2006/0067506 A1  Mar. 30, 2006

Related U.S. Application Data

(60) Provisional application No. 60/614,895, filed on Sep. 29, 2004.

(51) Int. Cl.
*H04M 3/00* (2006.01)
*H04M 5/00* (2006.01)

(52) U.S. Cl. ............. 379/266.01; 379/264; 379/265.01; 379/265.02; 379/265.09; 379/309

(58) Field of Classification Search ................. 379/265, 379/266.01, 265.01, 265.02, 264, 265.09, 379/308, 309; 709/224, 219, 227
See application file for complete search history.

(56) References Cited

U.S. PATENT DOCUMENTS 4,048,452 A  9/1977 Oehring et al.
4,163,124 A  7/1979 Jolissaint (Continued)

FOREIGN PATENT DOCUMENTS

CA  2143198  1/1995

(Continued)

OTHER PUBLICATIONS

*Definity® Enterprise Communications Server Release 9.5 Guide to ACD Call Centers*, Avaya Communications, 555-233-506, Issue 4 (Jul. 2001), pp. 9-13.

(Continued)

*Primary Examiner*—Thjuan K Addy
(74) *Attorney, Agent, or Firm*—Sheridan Ross P.C.

(57) ABSTRACT

The present invention is directed to a contact center, comprising:
  (a) a plurality of media servers 112a-n, each of the media servers being associated with a plurality of corresponding agent communication devices 120a-i positioned in a respective agent domain 100a-n;
  (b) a plurality of gateways 128a-n, each of which is currently controlled by a corresponding one of the plurality of media servers 112a-n and positioned in a contactor domain 104; and
  (c) a packet-switched Wide Area Network (WAN) 108 connecting the plurality of media servers 128a-n and the plurality of gateways 112a-n. A first gateway 128a is operable to physically park an incoming customer contact in the customer domain 104 until the occurrence of a call transfer event and, upon the occurrence of a call transfer event, to transfer the parked customer contact from the first gateway 128a to at least one of (i) a second media gateway 128b for processing by the second media gateway's corresponding second controlling media server 112b and (ii) a first media server 112a controlling the first gateway 128a.

23 Claims, 3 Drawing Sheets

U.S. PATENT DOCUMENTS

| | | |
|---|---|---|
| 4,466,098 A | 8/1984 | Southard |
| 4,567,323 A | 1/1986 | Lottes et al. |
| 4,633,039 A | 12/1986 | Holden |
| 4,700,292 A | 10/1987 | Campanini |
| 4,737,983 A | 4/1988 | Frauenthal et al. |
| 4,757,529 A | 7/1988 | Glapa et al. |
| 4,797,911 A | 1/1989 | Szlam et al. |
| 4,893,301 A | 1/1990 | Andrews et al. |
| 4,894,857 A | 1/1990 | Szlam et al. |
| 5,001,710 A | 3/1991 | Gawrys et al. |
| 5,073,893 A | 12/1991 | Kondou |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,214,692 A | 5/1993 | Chack et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,369,695 A | 11/1994 | Chakravarti et al. |
| 5,390,243 A | 2/1995 | Casselman et al. |
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Constantini et al. |
| 5,524,147 A | 6/1996 | Bean |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,094,479 A | 7/2000 | Lindeberg et al. ........... 379/220 |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |

| | | | |
|---|---|---|---|
| 6,389,132 | B1 | 5/2002 | Price |
| 6,389,400 | B1 | 5/2002 | Bushey et al. |
| 6,424,709 | B1 | 7/2002 | Doyle et al. |
| 6,426,950 | B1 | 7/2002 | Mistry |
| 6,427,137 | B2 | 7/2002 | Petrushin |
| 6,430,282 | B1 | 8/2002 | Bannister et al. |
| 6,434,230 | B1 | 8/2002 | Gabriel |
| 6,449,356 | B1 | 9/2002 | Dezonno |
| 6,449,358 | B1 | 9/2002 | Anisimov et al. |
| 6,449,646 | B1 | 9/2002 | Sikora et al. |
| 6,453,038 | B1 | 9/2002 | McFarlane et al. |
| 6,463,148 | B1 | 10/2002 | Brady |
| 6,463,346 | B1 | 10/2002 | Flockhart et al. |
| 6,463,415 | B2 | 10/2002 | St. John |
| 6,480,826 | B2 | 11/2002 | Pertrushin |
| 6,490,350 | B2 | 12/2002 | McDuff et al. |
| 6,535,600 | B1 | 3/2003 | Fisher et al. |
| 6,535,601 | B1 | 3/2003 | Flockhart et al. |
| 6,560,330 | B2 | 5/2003 | Gabriel |
| 6,560,649 | B1 | 5/2003 | Mullen et al. |
| 6,560,707 | B2 | 5/2003 | Curtis et al. |
| 6,563,920 | B1 | 5/2003 | Flockhart et al. |
| 6,597,685 | B2 | 7/2003 | Miloslavsky et al. |
| 6,614,903 | B1 | 9/2003 | Flockhart et al. |
| 6,650,748 | B1 | 11/2003 | Edwards et al. |
| 6,697,457 | B2 | 2/2004 | Petrushin |
| 6,697,858 | B1 * | 2/2004 | Ezerzer et al. .............. 709/224 |
| 6,704,409 | B1 | 3/2004 | Dilip et al. |
| 6,707,903 | B2 | 3/2004 | Burok et al. |
| 6,754,333 | B1 | 6/2004 | Flockhart et al. |
| 6,766,013 | B2 | 7/2004 | Flockhart et al. |
| 6,766,014 | B2 | 7/2004 | Flockhart et al. |
| 6,947,543 | B2 | 9/2005 | Alvarado et al. |
| 7,035,927 | B2 | 4/2006 | Flockhart et al. |
| 2001/0043608 | A1 | 11/2001 | Potter et al. ................. 370/401 |
| 2002/0106071 | A1 | 8/2002 | Uppaluru et al. ....... 379/265.02 |
| 2002/0194002 | A1 | 12/2002 | Pertrushin |
| 2003/0174830 | A1 | 9/2003 | Boyer et al. |
| 2003/0177017 | A1 | 9/2003 | Boyer et al. |
| 2004/0203878 | A1 | 10/2004 | Thomson |

FOREIGN PATENT DOCUMENTS

| | | |
|---|---|---|
| CA | 2174762 | 3/1996 |
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |
| WO | WO 2004/017161 | 2/2004 |

OTHER PUBLICATIONS

*Communication Manager Call Vectoring and EAS Guide*, Avaya Communications, Issue 1.0 (Nov. 2003), pp. 21-28, 277-304.
Brochure entitled "Avaya Call Center," Avaya Inc. (2004), 5 pages.
Brochure entitled, "Avaya Media Servers and Avaya Media Gateways," Avaya Inc. (2004).
Phelps, Kay, "The IP Contact Center," *Avaya White Paper* (Oct. 2001), pp. 1-11.
*Avaya MultiVantage™ Software on Avaya S8700 Media Server, Avaya S8300 Media Server, Avaya Definity Server R, Avaya Definity Server SI and Avaya Definity Server CSI*, Avaya Release 1.1.2, 555-233-423, Issue 1 (Aug. 2002), pp. 1-33.
*Overview of the Avaya G350 Media Gateway*, Avaya Communications (Jun. 2004), pp. 25-33, 41.
*Installation and Upgrades for G700 with S8300 or S8700*, Avaya Communications, 555-234-100, Issue 3 (May 2003), p. 124.
*Installing the Avaya S8500 Media Server with an Avaya G650 Media Gateway*, Avaya Communications (Dec. 2003), pp. 97, 103-5, 124.
Communication dated Jan. 19, 2006 from the European Patent Office transmitting the European Search Report and European Search Opinion for counterpart Application No. 05255131.4-2414, 6 pages.
Official Action for Canadian Patent Application No. 2,505,019, mailed Jan. 11, 2008.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Chavez, David, et al., "Avaya MultiVantage Software: Adapting Proven Call Processing for the Transition to Converged IP Networks," Avaya, Inc., Aug. 2002.
Coles, Scott, "A Guide for Ensuring Service Quality In IP Voice Networks," Avaya, Inc., 2002, pp. 1-17.
Dawson, "NPRI's Powerguide, Software Overview" Call Center Magazine (Jun. 1993), p. 85.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.
Foster, Robin, et al., "Avaya Business Advocate and its Relationship to Multi-Site Load Balancing Applications," Avaya, Inc., Mar. 2002, 14 pages.
GEOTEL Communications Corporation Web site printout entitled "Intelligent CallRouter" Optimizing the Interaction Between Customers and Answering Resources., 1998, 6 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L.F. Lamel and J.L. Gauvain, Language Identification Using Phone-Based Acoustic Likelihood, ICASSP-94, date unknown; 4 pages, Submitted on Feb. 14, 2005.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
MIT Project Oxygen, Pervasive, Human-Centered Computing (MIT Laboratory for Computer Science) (Jun. 2000) pp. 1-15.
Presentation by Victor Zue, The MIT Oxygen Project, MIT Laboratory for Computer Science (Apr. 25-26, 2000) 9 pages.
Stevenson et al.; "Name Resolution in Network and Systems Management Environments"; http://netman.cit.buffalo.edu/Doc/DStevenson/NR-NMSE.html; printed Mar. 31, 2003; 16 pages.

"Applications, NPRI's Predictive Dialing Package," Computer Technology (Fall 1993), p. 86.

"Call Center Software You Can't Outgrow," Telemarketing® (Jul. 1993), p. 105.

"Domain Name Services," available at http://www.pism.com/chapt09/chapt09.html, downloaded Mar. 31, 2003, 21 pages.

"eGain's Commerce 2000 Platform Sets New Standard for eCommerce Customer Communications," Business Wire (Nov. 15, 1999)., 3 pages.

"Internet Protocol Addressing," available at http://samspade.org/d/ipdns.html, downloaded Mar. 31, 2003, 9 pages.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-Athena, Section 5—Company C520, p. 95, 1992.

"VAST™, Voicelink Application Software for Teleservicing®," System Manager User's Guide, Digital Systems (1994), pp. ii, vii-ix, 1-2, 2-41 through 2-77.

"When Talk Isn't Cheap," Sm@rt Reseller, v. 3, n. 13 (Apr. 3, 2000), p. 50.

Examination Report for European Patent Application No. 05255131.4, mailed Nov. 10, 2006.

Examination Report for European Patent Application No. 05255131.4, mailed Jul. 8, 2008.

Background of the Invention for the above-captioned application (previously provided), Submitted on Feb. 14, 2005.

* cited by examiner

METHOD AND APPARATUS FOR GLOBAL CALL QUEUE IN A GLOBAL CALL CENTER

CROSS REFERENCE TO RELATED APPLICATION

This application claims the benefits under 35 U.S.C. § 119 of U.S. Provisional Patent Application Ser. No. 60/614,895, filed Sep. 29, 2004, of the same title and to the same inventors, which is incorporated herein by this reference.

FIELD OF THE INVENTION

The present invention is directed generally to servicing a contactor in a contact center and specifically to servicing a contactor in a global call center.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. Generally, the only condition that results in a contact not being delivered to an available agent is that there are no contacts waiting to be handled.

Global contact centers have been introduced to use low cost agents in one country to service customers in another country. In global contact centers, the agents (or agent domain) can be located in one or more countries, such as India and/or the Philippines, with the customers (or caller domain) being located in a different country, such as the United States. The agent and caller domains are separated by a, commonly packet-switched, Wide Area Network or WAN. What is variable is the placement of the ACD logic, agent state information, audible feedback devices, logical call queues, and physical call queues. "Physical call queue" refers to the physical endpoints or ports to which the voice calls are connected while the caller is waiting in queue for servicing by an agent.

To maintain low toll charges and preserve bandwidth, different contact center architectures have been employed.

In one architecture, the ACD logic, agent state, audible feedback, and logical and physical call queues are all maintained in the caller domain. Calls are delivered to IP agent stations over the WAN when the agent becomes available to service the call. When a WAN link goes down and the agent stations attempt simultaneously to re-register with the ACD logic, the concomitant traffic on the link can overwhelm the capacity of the IP connection, thereby needlessly and substantially delaying the registration of the stations and servicing of enqueued contacts by the agents.

In another architecture, the ACD logic, agent state, audible feedback, and logical and physical call queues are all maintained in the agent domain. For example, this architecture requires calls from the United States to be queued in Asia. While the calls are queued, music is played to the callers, using up limited WAN bandwidth. Moreover, where multiple ACD's are located in Asia and a call enqueued at a first ACD is to be transferred over the WAN to a second ACD, the voice, which is compressed once over the WAN when it is forwarded to the first ACD, is compressed a second time to be transferred to the second ACD. The multiple compressions can cause an unacceptably low voice quality. A circuit-switched trunk can be employed in this architecture to handle calls between the caller and agent domain and/or between agent domains but such trunks are prohibitively expensive.

In another architecture disclosed in U.S. Pat. No. 5,524,147, ACD's are located in both the caller and agent domains. The call is held or parked at the ACD in the caller domain while a placeholder or proxy is placed in a queue in each ACD in the agent domain. The ACD in the caller domain holding the call provides audible caller feedback and maintains the physical call queue, and each ACD in the agent domain provides the ACD logic, agent state, and logical call queues. When an agent is available to service the call, the call is physically moved to the appropriate ACD in the agent domain. This approach is not only costly but also can be inefficient for the contact center agents. In large global contact centers with multiple ACD's in the agent domain, there is a high possibility that two or more agents in different ACD's can become available to service the call at approximately the same time. Glare can result in which an attempt is made to transfer the same call to different ACDs in the agent domain, thereby creating ghost calls and causing one or more agents to wait for a call that never arrives. Moreover, the architecture can be wasteful of scarce processing resources in the various ACD's. Not only does logically or physically queuing each and every call at multiple location requires the ACD's collectively to do much more work than simply logically and physically queuing the call at one ACD but also call reporting and managing is made much more difficult.

SUMMARY OF THE INVENTION

These and other needs are addressed by the various embodiments and configurations of the present invention. The present invention is generally directed to a geographically distributed contact center, with the ACD logic being located in the agent domain and ACD-controlled contact processing computational components, such as port networks and gateways, being located in the caller domain. As used herein, "agent domain" refers to a geographic region in which the agents and their corresponding communication devices are located while the "caller or contactor domain" refers to a geographic region different from (and not overlapping) the agent domain in which the third party callers/contactors and their corresponding communication devices are located. Typically, the agent domain is located in a first country while the caller/contactors domain is located in a second different country.

In a first embodiment of the present invention, a method for processing a contact from a contactor includes the steps of:

(a) a computational component (such as a gateway or port network) receiving an incoming contact (which may be any type of real-time or near real-time packet switched or circuit switched communication such as a live voice, video and/or text communication) from a contactor;

(b) the computational component setting up and parking the incoming contact;

(c) the computational component signaling a media server regarding the existence of the incoming contact, wherein the media server currently controls the computational component, the media server is in communication with a plurality of agent communication devices, the media server is located in the agent domain, and the computational component is located in the contactor domain;

(d) while the contact is physically located at the computational component, the media server assigning to the contact a queue position in a logical work item queue; and (e) when the assigned queue position has advanced to a selected queue position, transferring the contact from the computational component to the media server for servicing by an agent associated with one or more of the agent communication devices.

The contact center can be not only a single-site but also a multi-site contact center. In the latter configuration, the contact center includes a number of media servers, each serving a corresponding number of agent communication devices and being located in different agent domains (or being collocated with the agent communication devices and agents), and a number of contact processing computational components, typically port networks and/or media gateways, located in the contactor domain. The computational components are collocated and typically interconnected by a circuit-switched line for ease of transferring contacts from one computational component to another contact processing computational component. As used herein, "collocated" refers to the computational components being located in close physical proximity to one another, such as being located in a common structure or building, in a common enclosure, or in a common cabinet, and/or being interconnected by a Local Area Network or LAN. A "LAN" refers to a network connecting several computers that are located on a user's premises within a limited, moderately sized geographical (e.g., located nearby one another such as in the one or more rooms or within one or more buildings), allowing them to share files and devices, such as printers and databases. LANs typically do not use store-and-forward techniques. Examples of protocols used by LANs include the Ethernet and Token Ring protocols.

The contact processing computational component and controlling media server can be connected by a Wide Area Network or WAN. As used herein, a WAN refers to a network that interconnects computing resources that are widely separated geographically (usually over 100 km), such as a network spanning a town, city, state, and/or country. A WAN commonly spans an area greater than five miles. The Internet is a set of interconnected WANs. WANs typically utilize protocols such as the TCP/IP suite of protocols, Asynchronous Transfer Mode (ATM) protocol, and the Broadband Integrated Services Digital Network (B-ISDN). Unlike a LAN, a WAN, due to limited available bandwidth, typically uses compressed voice, music, and/or video information.

In one contact center configuration, not only the ACD logic but also agent state information and logical call queues are maintained in the agent domain while the audible feedback and physical call queues are located in the caller domain. Contrary to the prior art practice of remoting of port networks and gateways in the agent domain with the ACD logic being located in the caller domain, this configuration does the opposite when a call is delivered to the ACD logic, the call is terminated to an endpoint on the remote gateway/port network in the caller domain and receives audible feedback from a feedback device, such as an announcement circuit or tone generator, on the remote gateway/port network in the caller domain. Concurrently, the call is logically queued in the ACD logic in the agent domain. The call is delivered to an agent over the IP link in the WAN when the agent becomes available.

In large multi-site configurations with multiple geographically separated agent domains, ACD logic in each agent domain maintains their respective physical call queues in the caller domain. Additionally, all port networks/gateways in the caller domain are collocated and networked by means of inexpensive direct circuit-switched connections. This complex of port-networks/gateways in the caller domain forms a global call queue for the contact center. When calls need to be offloaded or redirected from one agent domain to another, the calls are redirected from one port network/gateway to another over the inexpensive, high-capacity, direct circuit-switched connections in the global call queue.

The present invention can have a number of advantages. It can eliminate the problems of mass re-registration of agent IP stations across the WAN, bandwidth consumption caused by playing audible feedback across the WAN to enqueued callers, rerouting of calls between agent domains across highly expensive circuit-switched connections, the loss of voice quality due to double or higher compression, and the high costs, contact center inefficiencies, high rates of processing resource consumption, glare, and labor intensiveness of placing ACD logic in both the agent and caller domains.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Architecture

Figure 1:
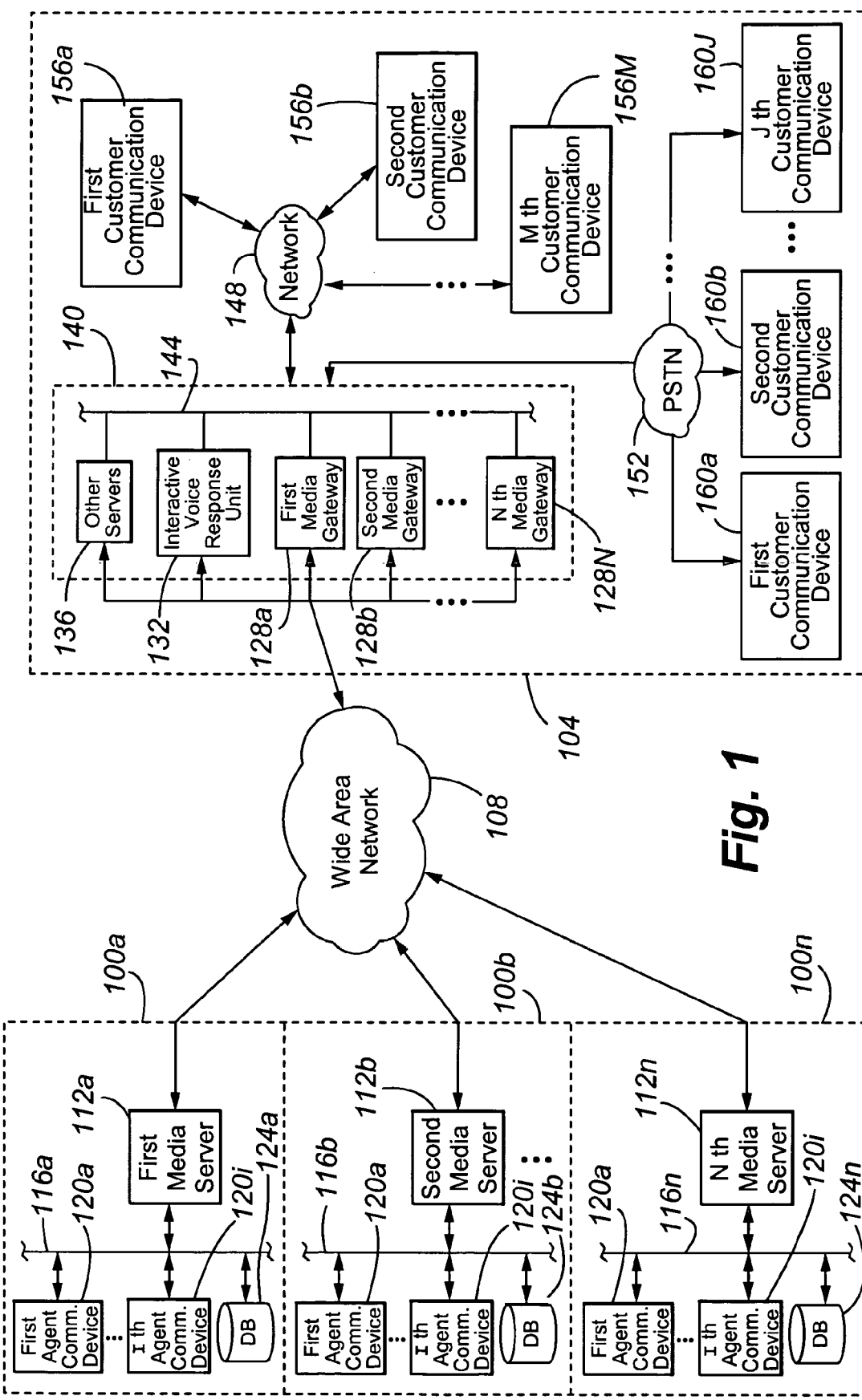
FIG. 1 is a block diagram of an architecture according to an embodiment of the present invention.

Referring to FIG. 1, a first, second, . . . nth agent domains 100a-n are separated from a caller domain 104 by a wide area network or WAN 108. The wide area network 108 is commonly packet-switched and employs one or more of the TCP/IP suite of protocols, the Session Initiation Protocol or SIP, and/or the H.323 protocol. In a preferred embodiment, the WAN 108 is international and even more preferably is transoceanic. To conserve bandwidth, packeted voice and/or music transmitted over the WAN 108 is compressed using a suitable compression algorithm, such as the G.711 and G.729 codecs and RTP header compression.

Each of the agent domains 100a-n includes a corresponding media server 112a-n. Each media server 112a-n is connected by a corresponding Local Area Network or LAN 116a-n to a plurality of corresponding agent communication devices 120a-i and a corresponding database 124a-n. As noted, the agent domains 100a-n are typically located in a country different from the caller domain 104.

The media server can be any converged architecture for directing circuit-switched and/or packet-switched customer contacts to one or more communication devices. Typically, the server is a stored-program-controlled system that conventionally includes interfaces to external communication links, a communications switching fabric, service circuits (e.g., tone detectors and generators, etc.), memory for storing control programs and data, and a processor (i.e., a computer) for executing the stored control programs to control the interfaces and the fabric and to provide automatic contact-distribution functionality. Features provided by the media server typically include not only telephony features and intelligent contact routing but also localization, collaboration, mobility, messaging, system management, attendant features, networking, and application programming interfaces. The server typically includes a network interface card (not shown) to provide services to the serviced telecommunication devices. Illustratively, the media server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Avaya Inc.'s IP600™ LAN-based ACD system, or an S8100™, S8300™, S8500™, S8700™, or S8710™ media server running a modified version of Avaya Inc.'s Communication Manager™ voice-application software with call processing capabilities and contact center functions. Other types of known switches and servers are well known in the art and therefore not described in detail herein.

Figure 2:
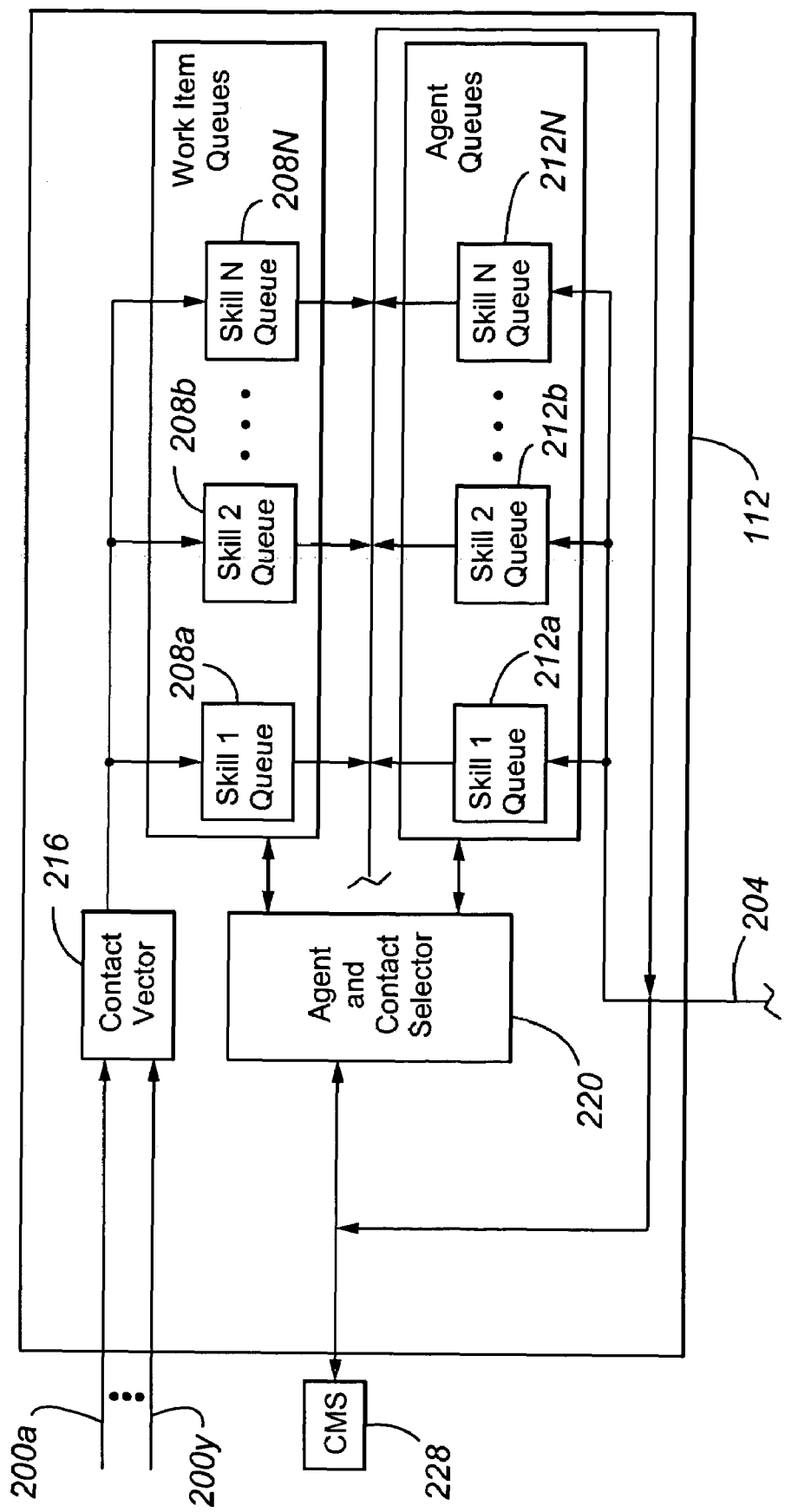
FIG. 2 is a depiction of ACD logic in a media server.

Referring to FIG. 2, one possible configuration of the server 112 is depicted. The server 112 is in communication with a plurality of customer communication lines 200a-y (which are part of the WAN 108 and can be one or more packet-switched links) and agent communication line 204 (which can be a voice-and-data transmission line such as LAN 116 and/or a circuit switched voice line). The server 112 can include Avaya Inc.'s Operational Analyst™ or OA with On-Line Analytical Processing or OLAP technology, Basic Call Management System™ or BCMS, or another type of Call Management System or CMS that gathers contact records and contact-center statistics for use in generating contact-center reports. OA, BCMS, and CMS will hereinafter be referred to individually or collectively as CMS 228.

Referring to FIG. 2, included among the data stored in the server 112 is a set of logical work item queues 208a-n and a separate set of physical agent queues 212a-n. Each logical work item queue 208a-n corresponds to a different set of agent skills, as does each agent queue 212a-n. Conventionally, work items are prioritized and either are enqueued in individual ones of the logical work item queues 208a-n in their order of priority or are enqueued in different ones of a plurality of logical work item queues that correspond to a different priority. Likewise, each agent's skills are prioritized according to his or her level of expertise in that skill, and either agents are enqueued in individual ones of physical agent queues 212a-n in their order of expertise level or are enqueued in different ones of a plurality of physical agent queues 212a-n that correspond to a skill and each one of which corresponds to a different expertise level. Included among the control programs in the server 112 is a work item or contact vector 216. Contacts incoming to the contact center are assigned by work item vector 216 to different work item queues 208a-n based upon a number of predetermined criteria, including customer identity, customer needs, contact center needs, current work item center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels.

Call vectoring, one type of work item routing which may be used by the contact vector 216, is a process of defining vector programs that determine how a specific call should be routed and what call treatment that call is to be given. Call vectoring includes three basic components, namely Vector Directory Numbers (VDNs), vectors, and vector commands. When a contact arrives, the contact is first directed to a VDN. A VDN is an internal telephone number that, in turn, directs the call to the specific vector. The VDN represents the call type or category (or the service desired by the contactor), such as billing, customer service, sales, and the like. As will be appreciated, the Directory Number Information Service or DNIS digits and/or ANI/II digits are typically used to direct the incoming contact to an appropriate VDN. Multiple VDN's can point to the same or to different vectors, depending on whether the relevant contacts are to receive the same or different treatment. The vector is a set of commands that define the processing of a contact.

Where multiple media servers and differing groups of agents are employed, one media server may intelligently offload some or all contacts to another media server. A contact arriving at a vector that is unable to handle the contact due to preset limits can interflow the contact to another media server in a remote location, such as from the first media server to the second media server, when the other media server is able to receive the contact. In one application, the media server receiving the contact compares specified splits or skills, determines which will best serve the contactor, and deliver the contact to that resource. An example of this feature is Avaya Inc.'s Best Services Routing™ software.

Each of the agent communication devices 120a-i can be one or more packet-switched and/or circuit-switched communication devices. For example, the devices can be Avaya Inc.'s, 4600 Series IP Phones™, IP softphones such as Avaya Inc.'s, IP Softphone™, Personal Digital Assistants or PDAs, Personal Computers or PCs, laptops, H.320 video phones and conferencing units, voice messaging and response units, traditional computer telephony adjuncts, and wired and wireless circuit-switched telephones.

The set of data stores or databases 120a-n contain contact or customer-related information and other information that can enhance the value and efficiency of the contact. The information included in the database includes, for example, customer identity, contact information, transaction and sales history, and the like.

In the caller domain 104, a number of contact processing computational components are located remotely from the agent domains 100a-n. The components include first, second, . . . nth media gateways 128a-n, Interactive Voice Response Unit or IVR 132, and other servers 136, such as a fax server and an email server. Each of the gateways 128a-n is controlled by a corresponding one of the active or primary media servers 112a-n or, stated differently, each active or primary media server 112a-n controls one or more gateways 128a-n. In other words, the gateway controller of each gateway is located in a corresponding one of the media servers, and the ACD logic and logical call queues are not located in or collocated with the gateways 128. For example, the first media server 112a controls the first media gateway 128a; the second media server 112b the second media gateway 128b, and so on. The various components are preferably interconnected by a circuit-switched line 144, such as an E1 or T1 connection, but a packet-switched LAN may also be employed. In a preferred configuration, the various components are collocated, such as in a common cabinet 140, and each set of gateways (controlled by a common primary media server) corresponds to a different set of telephone numbers or electronic addresses.

Each of the gateways 128a-n is an electronic signal repeater and protocol converter that provides a telephone exchange service, supporting the connection of various types of telephones (such as Digital Control Processor or DCP phones, analog phones, and IP telephones) and outside packet-switched and/or circuit-switched telephone lines (such as analog trunks, ISDN lines, E1/T1 voice trunks, and WAN routing IP trunks). Telephone lines are connected to the gateway via ports and media modules on the chassis, with different media modules providing access ports for different types of telephones and lines. Voice and signaling data between packet-switched and circuit-switched protocols is effected by the media modules converting the voice path to a TDM bus inside the gateway. An engine, such as a Voice Over IP or VoIP engine, converts the voice path from the TDM bus to a compressed or uncompressed and packetized VoIP, typically on an Ethernet connection. Each gateway commonly includes a number of port and trunk circuit packs for performing selected telecommunications functions, such as (DTMF) tone detection, tone generation, playing audio (music and/or voice) announcements, traffic shaping, and call admission control, a media processor, and one or more IP server interfaces. The gateway may perform policy-based routing, which uses a policy list structure to implement a routing scheme based on traffic source, destination, type, and other characteristics. Common applications include separate routing for voice and data traffic, routing traffic originating from different sets of users through different Internet connections (or Internet Service Providers or ISP's), and defining backup routes for defined classes of traffic. As noted, the gateway controller for each gateway is located in the media server or, stated differently, the gateway is external and not internal to the media server. Examples of gateways include Avaya Inc.'s SCC1™, MCC1™, CMC™, G350™, G600™, G650™, and G700™.

The plurality of gateways 128*a-n* are in turn connected with a packet-switched network 148, which is commonly a WAN, and the Public Switched Telephone Network 152. The network 148 and PSTN 152 respectively enable communications of off-premises packet-switched first, second, . . . mth customer communication devices 156*a-m* and circuit-switched first, second, . . . jth customer communication devices 160*a-j*. The communication devices 156*a-m* can be any of the packet-switched communication devices, and the communication devices 160*a-j* can be any of the circuit-switched communication devices referenced above.

As will be appreciated, the components in the various agent domains 100*a-n* and in the cabinet 144 collectively form an enterprise network associated with the contact center.

Operation of the Architecture

The operation of the architecture of FIGS. 1 and 2 will now be described with reference to FIG. 3.

Figure 3:
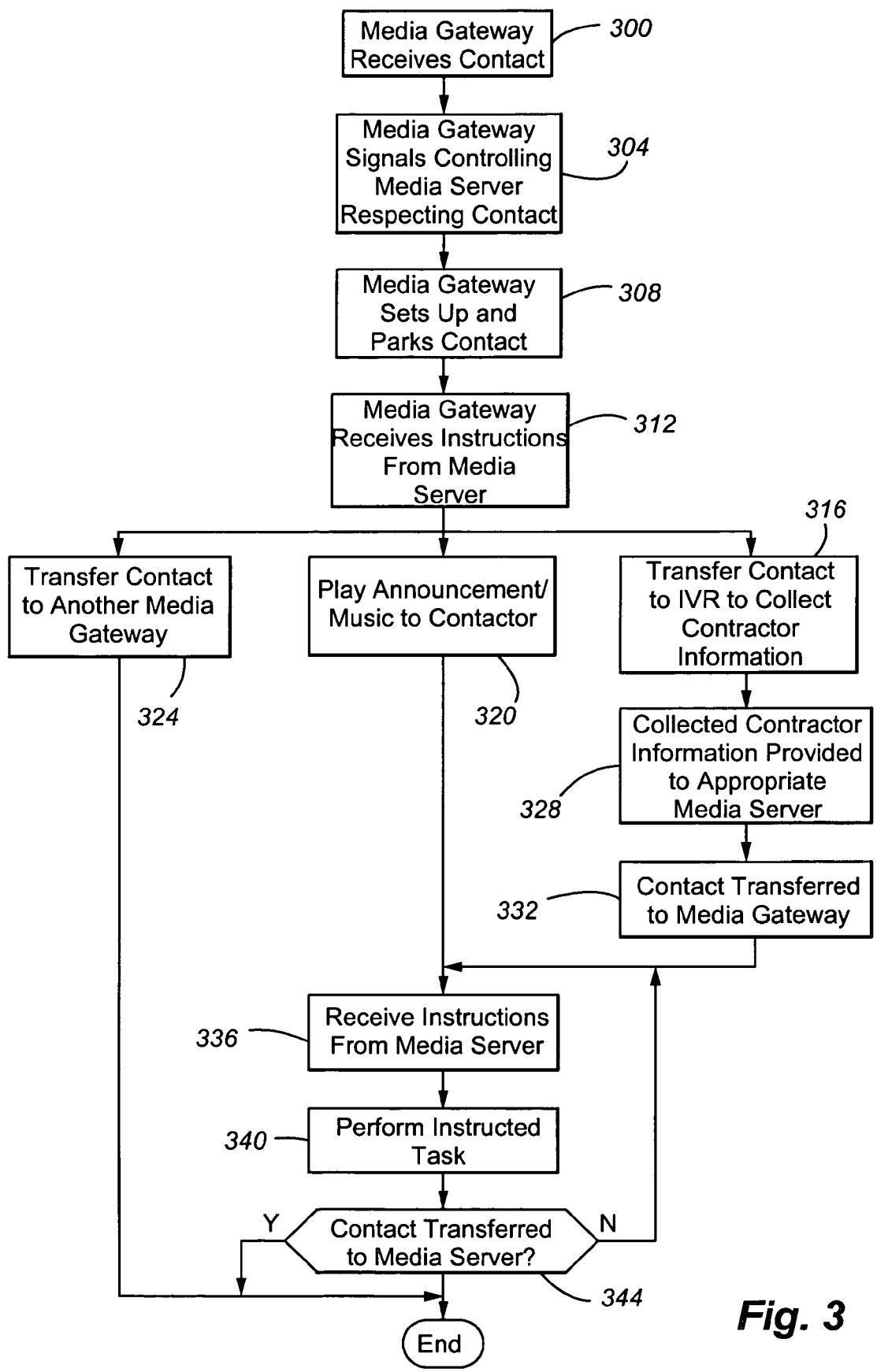
FIG. 3 is a flowchart depicting the operation of a media gateway when a contact is received.

Referring to FIG. 3, a media gateway 128 receives an incoming contact from one of the off premises customer communication devices 156 or 160 in step 300. The network 148 and PSTN 152 are configured to direct an incoming customer contact to a port of a gateway 128 where the contact physically stops (or the interface with the contactor is located in the caller domain 104). For example, the incoming contact can be a telephone number or electronic address associated with the gateway's port and therefore with a corresponding media server.

In step 304, the media gateway collects contact-related information and forwards the information to the corresponding media server over the WAN in the form of a collection of packets to notify the corresponding media server of the presence of the incoming contact. The transmitted information can include, for a circuit-switched call, tones detected (by the tone detector resident in the gateway) on the customer inputted telephone number or Dial Number Identification Service or DNIS information, the customer inputted electronic (IP) address, and optionally the telephone number/electronic address associated with the customer communication device.

In step 308, the media gateway sets up and parks the contact physically (or maintains the physical call queue of customer contacts) at the media gateway in the caller domain 104. In step 312, the media gateway receives contact processing instructions from the corresponding controlling media server. The instructions are generated by the corresponding media server in response to retrieving appropriate customer and agent records from the server's respective database and directing the contact to an appropriate VDN. The instructions can request a number of call processing activities to be performed. Examples shown in FIG. 3 include transferring the contact to the IVR 132 to collect contactor information (step 316), playing announcements and/or music on hold to the contactor (step 320), and transferring the contact to another media gateway corresponding to a different media server (step 324). When the contact is received, the media server typically places a placeholder or token for the contact in the appropriate logical work item queue 208. The position in the queue is commonly based on a time stamp assigned to and representing when the contact was received by the media gateway or when the controlling media server was notified of the contact. The placeholder or token identifies the contact in some manner. For example, the placeholder or token can include a pointer to a data structure associated with the contact, which data structure includes the associated contact information, such as the assigned time stamp, age, queue priority of the contact, contactor identifier, parking gateway identifier, and/or a pointer to a data structure associated with the contact maintained at the parking gateway.

With reference to step 316, the contact is transferred to the IVR 132, which uses a predetermined script to receive voice and/or tone feedback from the contactor. A voice recognition engine resident in the IVR 132 performs word detection, compares the words to a selected library of words, and provides symbols representing the matched words. Tones (DTMF) are detected by the tone detector resident in the media gateway 128. In step 328, the collected contactor information is provided over the WAN 108 to the controlling media server 112 in a collection of packets. Based on the received contactor information, the controlling media server 112 determines from the original VDN's vector or a further VDN and its corresponding vector how to further process the contact. The further instructions are then forwarded over the WAN 108 to the gateway 128 and the instructions are received in step 336 (discussed below).

With reference to step 320, the contact is connected with a port of an announcement circuit in the gateway 128. The announcement circuit plays announcements and/or music on hold to the contactor until further instructions are received from the controlling media server 112 in step 336.

In step 336, the instructions from the controlling media server 112 can take many forms, including to perform a same or different one of the functions in steps 316, 320, and 324. The instructed task is performed in step 340.

With reference to step 324, the gateway 128 transfers the contact to a different gateway 128 having a different controlling media gateway 112. This is done easily and cheaply over the communication medium 144. Depending on the contact center configuration, the collected contactor information may be forwarded to the new controlling media server 112 by the former controlling media server 112 and/or from the transferring media gateway 128 over the WAN 108.

After step 340 is performed by the media gateway 128, the media gateway 128 determines in decision diamond 344 whether the contact has been transferred over the WAN 108 to the controlling media server 112 for servicing by an agent at an agent communication device 120 in the agent domain serviced by the controlling media server. Best Services Routing or BSR may immediately determine if the current gateway/server combination is the best resource for the call, or if the call should be immediately transferred to another gateway/server combination where it will receive faster or better service. In this case, the call is transferred to another media server. When the call arrives at the second gateway, the entire physical-queue and logical-queue process commonly starts again. If not, the media gateway 128 returns to and repeats step 336. If so or after completing step 324, the media gateway 128 terminates operation with respect to the transferred contact.

As will be appreciated, an infinite number of operational flow charts is possible for a contact center. The flow chart of FIG. 3 is being provided only for purposes of illustration.

A number of variations and modifications of the invention can be used. It would be possible to provide for some features of the invention without providing others.

For example in one alternative embodiment, the invention is useful for a single media server 112 controlling a plurality of media gateways 128.

In another embodiment, the packet-switched WAN 108 can be replaced by a circuit-switched WAN, such as by one or more trunks.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A contact center, comprising:
    (a) a plurality of media servers, each of the media servers being associated with a plurality of corresponding agent communication devices, wherein each of the media servers and corresponding agent communication devices are positioned in a respective agent domain;
    (b) a plurality of gateways, each of which is currently controlled by a corresponding one of the plurality of media servers, the plurality of gateways being positioned in a contactor domain; and
    (c) a packet-switched Wide Area Network (WAN) connecting the plurality of media servers and the plurality of gateways, wherein a first gateway of the plurality of gateways is operable to physically park an incoming customer contact in the customer domain until the occurrence of a call transfer event, wherein a first media server of the plurality of media servers is operable to maintain a logical call queue in the agent domain corresponding to a physical call queue containing the physically parked incoming customer contact and, upon the occurrence of a call transfer event, to transfer the parked customer contact from the first gateway to at least one of (i) a second media gateway for processing by the second media gateway's corresponding second controlling media server and (ii) the first media server controlling the first gateway, and wherein signaling between the first gateway and the first media server respecting the parked incoming contact is transmitted over the WAN, and wherein the WAN is transoceanic.

2. The contact center of claim 1, wherein the plurality of gateways are collocated and in communication with one another.

3. The contact center of claim 2, wherein the plurality of gateways are located in a common enclosure.

4. The contact center of claim 1, wherein the voice communications are compressed when transmitted over the WAN.

5. The contact center of claim 1, wherein a circuit-switched communication line extends between the first and second gateways over which the parked incoming contact can be transferred.

6. The contact center of claim 1, wherein the first media server maintains a logical queue comprising a placeholder located therein, the location of the placeholder in the logical queue corresponding to a location of the parked incoming contact in the physical queue.

7. The contact center of claim 1, wherein the first gateway is operable to perform tone detection and play announcements and/or music to a contactor associated with the incoming contact while the incoming contact is parked.

8. The contact center of claim 1, further comprising an Interactive Voice Response Unit (IVR) collocated with the plurality of gateways and operable to interact with a contactor associated with the incoming contact to obtain contactor information.

9. A method for processing a contact from a contactor, comprising:
    (a) a contact processing computational component in a contactor domain receiving an incoming contact from a contactor;
    (b) the computational component setting up and physically parking the incoming contact at the computational component such that a physical resource of the computational component is dedicated to the incoming contact while the contactor waits for servicing;

(c) the computational component signaling a media server regarding the existence of the incoming contact, wherein the media server currently controls the computational component, the media server is in communication with a plurality of agent communication devices, the media server is located in an agent domain, and the computational component is located in a contactor domain;

(d) while the contact is physically located at the computational component, the media server assigning to the contact a queue position in a logical work item queue maintained on the media server; and (e) when the assigned queue position has advanced to a selected queue position, transferring the contact from the computational component to the media server for servicing by an agent associated with at least one of the agent communication devices, wherein the plurality of media servers are in communication with the plurality of gateways by means of a packet-switched network and the packet-switched network is transoceanic.

10. The method of claim 9, wherein the computational component is a gateway, wherein the gateway is a member of a plurality of collocated gateways, each of the gateways being currently controlled by a respective media server in a plurality of media servers, and wherein each of the media servers is in communication with a plurality of corresponding agent communication devices.

11. The method of claim 10, wherein the plurality of gateways are located in a common enclosure.

12. The method of claim 10, further comprising at least one of the following steps while the contact is physically located at the gateway:

(f) the computational component performing tone detection on signals received as part of the incoming contact;

(g) the computational component playing announcements to the contactor;

(h) the computational component playing music to the contactor; and (i) an Interactive Voice Response unit collecting information from the contactor.

13. The method of claim 12, wherein step (f) is performed.
14. The method of claim 12, wherein step (g) is performed.
15. The method of claim 12, wherein step (h) is performed.
16. The method of claim 12, wherein step (i) is performed.

17. The method of claim 11, wherein the plurality of collocated gateways are connected by a circuit-switched communication line and the communication line is located in the enclosure.

18. The method of claim 10, wherein the gateway controller is located at the media server.

19. The method of claim 9, further comprising while the contact is physically located at the computational component:

(f) the computational component transferring the contact to a second computational component, the second computational component being currently controlled by a second media server different from the media server currently controlling the transferring computational component.

20. A computer readable medium comprising processor executable instructions that, when executed by a processor, perform the steps of claim 9.

21. A logic circuit operable to perform the steps of claim 9.

22. A method comprising:

(a) receiving, at a port of a first gateway, an incoming first contact from a first contactor, the first gateway being located at a first location, the first location being in a first country;

(b) setting up and parking, by the first gateway, the incoming first contact;

(c) while the incoming contact is parked at the first gateway, collecting, by the first gateway, information related to the incoming first contact, the incoming first contact related information comprising one or more of a detected tone generated by a first communication device of the first contactor, an electronic address received from the first contactor, and an electronic address of the first communication device;

(d) while the incoming contact is parked at the first gateway, transmitting by a packet-switched first network, to a second gateway, the second gateway being located at a second location, the second location being in a second country;

(e) while the incoming contact is parked at the first gateway, and in response to receipt of the transmitted first contact related information, placing, by a media server, a placeholder in a first selected position of a logical contact queue, the placeholder associated with the incoming first contact;

(f) determining a first instruction based on the first contact related information;

(g) transmitting by the media server and over the first network, the first contact related information to the first gateway; and (h) when the placeholder has advanced to a second selected queue position, transferring the first contact to the media server for delivery to an agent, wherein the first network is transoceanic.

23. The method of claim 22, wherein, while the incoming contact is parked at the first gateway, the first contact is terminated at the first gateway and not the first media server.

* * * * *